US012654562B2

(12) United States Patent
Chetty et al.

(10) Patent No.: US 12,654,562 B2
(45) Date of Patent: Jun. 16, 2026

(54) DYNAMIC DRIVELINE TORSIONAL DAMPING VIA HIGH BANDWIDTH CONTROL

(71) Applicant: Atieva, Inc., Newark, CA (US)

(72) Inventors: Aditya Chetty, Fremont, CA (US); Vivek Attaluri, Fremont, CA (US)

(73) Assignee: Atieva, Inc., Newark, CA (US)

( * ) Notice: Subject to any disclaimer, the term of this patent is extended or adjusted under 35 U.S.C. 154(b) by 92 days.

(21) Appl. No.: 18/704,792

(22) PCT Filed: Oct. 28, 2022

(86) PCT No.: PCT/US2022/078897
§ 371 (c)(1),
(2) Date: Apr. 25, 2024

(87) PCT Pub. No.: WO2023/077081
PCT Pub. Date: May 4, 2023

(65) Prior Publication Data
US 2024/0416761 A1 Dec. 19, 2024

Related U.S. Application Data

(60) Provisional application No. 63/263,181, filed on Oct. 28, 2021.

(51) Int. Cl.
B60L 15/20 (2006.01)
G05D 13/62 (2006.01)

(52) U.S. Cl.
CPC ......... B60L 15/20 (2013.01); B60L 2240/421 (2013.01); B60L 2240/486 (2013.01)

(58) Field of Classification Search
CPC .. B60L 15/20; B60L 9/18; G01H 1/10; G01H 1/04; G01H 1/12; G05D 13/62
See application file for complete search history.

(56) References Cited

U.S. PATENT DOCUMENTS 5,410,228 A * 4/1995 Shibata ................... H02P 23/20
318/434
7,680,567 B2 * 3/2010 Syed ...................... B60K 6/445
701/22

(Continued)

OTHER PUBLICATIONS

International Search Report and Written Opinion for PCT Application No. PCT/US2022/078897, mailed on Jan. 31, 2023, 8 pages.

(Continued)

*Primary Examiner* — Tan Q Nguyen
(74) *Attorney, Agent, or Firm* — Brake Hughes Bellermann LLP

(57) ABSTRACT

A method comprises: applying, by a motor controller of an electric motor, a bandpass filter to a signal from a sensor on a rotor of the electric motor, the signal indicating rotational speed of the rotor to detect a torsional oscillation or vibration in a driveline of the electric motor to be attenuated; providing the filtered signal to a proportional derivative controller configured for disturbance rejection; generating, by the proportional derivative controller, an attenuation signal for attenuating the torsional oscillation or vibration in the driveline; combining the attenuation signal with a driver torque command signal to produce a combined torque command signal, the driver torque command signal indicating an amount of torque requested from the electric motor; and producing torque with the electric motor based on the combined torque command signal.

19 Claims, 5 Drawing Sheets

(56)     References Cited

U.S. PATENT DOCUMENTS

| 2012/0081051 A1* | 4/2012 | Kobayashi | B60W 10/08 903/930 |
| 2015/0123624 A1* | 5/2015 | Ookawa | B60W 10/26 322/22 |
| 2015/0180386 A1* | 6/2015 | Enoki | H02P 6/10 318/400.23 |
| 2016/0159340 A1* | 6/2016 | Chung | B60W 10/08 903/906 |
| 2018/0290659 A1* | 10/2018 | Tsukada | B60W 30/20 |
| 2021/0122359 A1 | 4/2021 | Cai et al. | |

OTHER PUBLICATIONS

Extended European Search Report for European Application No. 22888541.4, dated Sep. 5, 2025, 9 pages.

* cited by examiner

DYNAMIC DRIVELINE TORSIONAL DAMPING VIA HIGH BANDWIDTH CONTROL

CROSS-REFERENCE TO RELATED APPLICATION

This application is a 35 U.S.C. § 371 National Phase Entry Application from PCT Application No. PCT/US2022/078897, filed on Oct. 28, 2022, entitled "DYNAMIC DRIVELINE TORSIONAL DAMPING VIA HIGH BANDWIDTH CONTROL", and designating the U.S., which claims priority to U.S. Provisional Application No. 63/263,181, entitled "DYNAMIC DRIVELINE TORSIONAL DAMPING VIA HIGH BANDWIDTH CONTROL", filed Oct. 28, 2021, the disclosures of which are incorporated by reference herein in their entireties.

TECHNICAL FIELD

This document relates to damping torsional oscillations or vibrations in an electric motor.

BACKGROUND

In recent years, electric vehicle (EV) technology has continued to develop, and an increasing number of people are choosing to have an EV as a personal vehicle. EVs can be associated with oscillations or vibrations that are perceived by occupants, which can detract from the occupants' experience.

SUMMARY

In a first aspect, a method comprises: applying, by a motor controller of an electric motor, a bandpass filter to a signal from a sensor on a rotor of the electric motor, the signal indicating rotational speed of the rotor to detect a torsional oscillation or vibration in a driveline of the electric motor to be attenuated; providing the filtered signal to a proportional derivative controller configured for disturbance rejection; generating, by the proportional derivative controller, an attenuation signal for attenuating the torsional oscillation or vibration in the driveline; combining the attenuation signal with a driver torque command signal to produce a combined torque command signal, the driver torque command signal indicating an amount of torque requested from the electric motor; and producing torque with the electric motor based on the combined torque command signal.

Implementations can include any or all of the following features. The signal indicating the rotational speed of the rotor includes an estimate that takes into account a gear ratio used by gears of a powertrain. The bandpass filter is a static bandpass filter that passes through a fixed band of frequencies. The bandpass filter is an adaptive bandpass filter, the method further comprising detecting a frequency at which the torsional oscillation or vibration occurs in the driveline, and updating the adaptive bandpass filter based on the detected frequency. The method further comprises: enabling the proportional derivative controller in response to at least a first enablement determination comprising: the rotational speed being greater than a lower speed limit and less than or equal to an upper speed limit; and an amount of torque requested by the torque command signal being greater than or equal to a first threshold. The method further comprises: enabling the proportional derivative controller in response to the first enablement determination or a second enablement determination based on an absolute value of the rotational speed; otherwise, disabling the proportional derivative controller. The second enablement determination takes into account the absolute value of the rotational speed and the driver torque command signal. The second enablement determination comprises: the absolute value of the rotational speed being greater than or equal to a lower speed limit and less than or equal to an upper speed limit; and an amount of torque requested by the driver torque command signal being less than a second threshold. The driveline comprises the electric motor, gears, or a drive shaft of an electric vehicle.

In a second aspect, a vehicle comprises: an electric motor having a rotor; a sensor on the rotor, the sensor configured to generate a signal indicating a rotational speed of the rotor; and a motor controller, including: a bandpass filter configured to filter to the signal to produce a filtered signal to detect a torsional oscillation or vibration in a driveline of the electric motor to be attenuated; and a proportional derivative controller configured for disturbance rejection, the proportional derivative controller generating, based on the filtered signal, an attenuation signal for attenuating the torsional oscillation or vibration in the driveline, wherein: the motor controller is configured to combine the attenuation signal with a driver torque command signal to produce a combined torque command signal, the driver torque command signal indicating an amount of torque requested from the electric motor, and the electric motor is configured to produce torque based on the combined torque command signal.

Implementations can include any or all of the following features. The signal indicating the rotational speed of the rotor includes an estimate that takes into account a gear ratio used by gears of a powertrain. The bandpass filter is a static bandpass filter that passes through a fixed band of frequencies. The bandpass filter is an adaptive bandpass filter, and wherein the motor controller detects a frequency at which the torsional oscillation or vibration occurs in the driveline, and updates the adaptive bandpass filter based on the detected frequency. The motor controller enables the proportional derivative controller in response to at least a first enablement determination comprising: the rotational speed being greater than a lower speed limit and less than or equal to an upper speed limit; and an amount of torque requested by the torque command signal being greater than or equal to a first threshold. The motor controller: enables the proportional derivative controller in response to the first enablement determination or a second enablement determination based on an absolute value of the rotational speed; otherwise, disables the proportional derivative controller. In the second enablement determination the motor controller takes into account the absolute value of the rotational speed and the driver torque command signal. The second enablement determination comprises: the absolute value of the rotational speed being greater than or equal to a lower speed limit and less than or equal to an upper speed limit; and an amount of torque requested by the driver torque command signal being less than a second threshold. The sensor includes at least one of a resolver or an encoder. The driveline comprises the electric motor, gears, or a drive shaft of the vehicle.

BRIEF DESCRIPTION OF DRAWINGS

Like reference symbols in the various drawings indicate like elements.

DETAILED DESCRIPTION

This document describes examples of systems and techniques for attenuating (dampening) torsional oscillations or vibrations in an electric vehicle (EV) having an electric motor. In example implementations, a motor control unit can implement a motor control strategy that includes such torsional oscillation or vibration attenuation.

Electric powertrains with low inertia rotors/transmissions that have quick response times are sensitive to torsional oscillations or vibrations in the driveline. The source of these vibrations can be the resonances of the driveline modes due to torsional excitations from motor torque commands, torsional wheel disturbances (brake actuations or road inputs) and inherent dynamics of the motor. The present subject matter can detect the vibrations or oscillations corresponding to known driveline resonances or vibrations and attenuate them such that they cannot be perceived by the vehicle occupants.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, such as petroleum, diesel fuel, or natural gas, to name just a few examples. As used herein, an EV includes an onboard energy storage, sometimes referred to as a battery pack, to power one or more electric motors. Two or more EVs can have different types of energy storages, and/or different sizes thereof.

Figure 1:
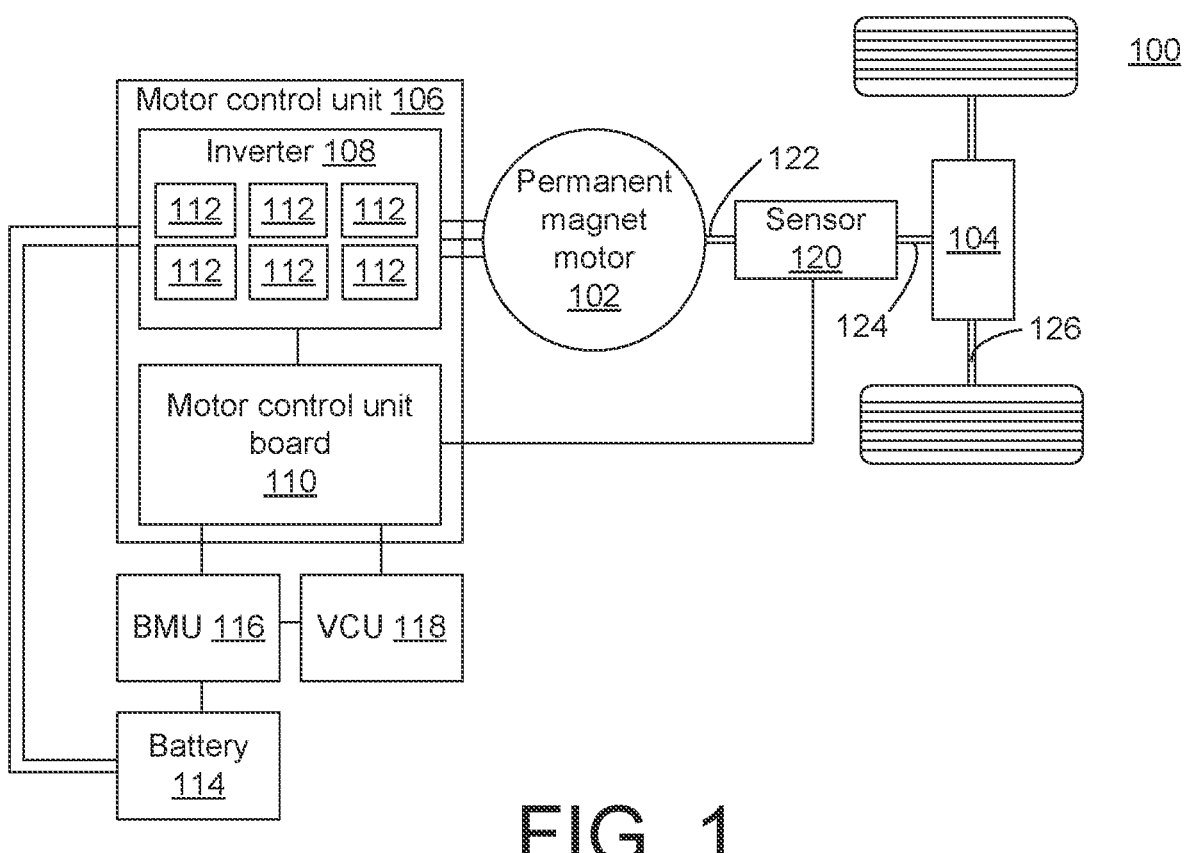
FIG. 1 shows an example of a vehicle having a permanent magnet motor.

FIG. 1 shows an example of a vehicle 100 having a permanent magnet motor 102. The permanent magnet motor 102 is given by way of example and, in some implementations, other type of motors can be used, such as induction motors. In this example, the permanent magnet motor 102 and/or other components of the vehicle 100 can be used with one or more other examples described elsewhere herein. Only portions of the vehicle 100 are shown, for simplicity. The permanent magnet motor 102 has one or more magnets positioned within, or on a surface of a rotor. The permanent magnet motor 102 can apply current to a stator surrounding the rotor to generate torque for one or more traction wheels. In some implementations, gears 104 can be provided between the permanent magnet motor 102 and the traction wheel(s). For example, the gears 104 can include a differential and/or can provide gear reduction.

The vehicle 100 can use a motor controller to operate the permanent magnet motor 102 as well as other components. Here, the vehicle 100 includes a motor control unit (MCU) 106 that includes an inverter 108 and an MCU board 110. The MCU board 110 controls the inverter 108. The MCU board 110 can include one or more processing components. In some implementations, the MCU board 110 includes one or more processors. For example, the MCU board 110 can also include one or more field-programmable gate arrays. The MCU 106 can also include one or more other components for controlling the permanent magnet motor 102. For example, gate drivers, shunt monitors, and cooling features can be included.

The inverter 108 can include one or more power stages to convert direct current (DC) to alternating current (AC) to drive the permanent magnet motor 102, and to convert AC to DC when recovering energy from the permanent magnet motor 102. The inverter 108 can use transistors 112 that are toggled on and off repeatedly to generate AC for, or recover energy from, the permanent magnet motor 102. In some implementations, six of the transistors 112 can be coupled in respective pairs to produce three-phase AC. The transistors 112 can be metal-oxide semiconductor field-effect transistors (MOSFETs), for example, silicon carbide MOSFETs. In some implementations, insulated-gate bipolar transistors (IGBTs) can be used.

The vehicle 100 includes a battery 114. The battery 114 can include one or more modules of electrochemical cells. For example, lithium-ion cells can be used. The battery 114 can be controlled by a battery management unit (BMU) 116. For example, the BMU 116 can manage the state of charge of the battery 114, and open and close the contactors between the battery 114 and the inverter 108. The battery 114, which is the energy source for vehicle propulsion, can be referred to as a high-voltage battery to distinguish it from a low-voltage (e.g., 12 V) battery that can power one or more components (e.g., the MCU board 110).

The vehicle 100 includes a vehicle control unit (VCU) 118. The VCU 118 can control the operational state of the vehicle 100. In some implementations, the VCU 118 can be coupled to both the BMU 116 and the MCU board 110. For example, the VCU 118 can coordinate torque requests for operation of the permanent magnet motor 102, such as based on a driver depressing an accelerator pedal. Using the approaches described herein, such torque requests can be adjusted in order to attenuate torsional oscillations or vibrations associated with operation of the permanent magnet motor.

The vehicle 100 includes a sensor 120 that can indicate a rotational position of the rotor in the permanent magnet motor 102. In some implementations, the sensor 120 can be mounted to a shaft of the rotor, and can give angle measurements. Using these angle measurements, the MCU 106 can determine rotational speed of the motor. For example, the sensor 120 can include analog circuitry (e.g., a resolver) or digital circuitry (e.g., an encoder) to determine rotational speed.

The vehicle 100 can execute a motor control strategy during operation of (e.g., when driving) the vehicle 100. This motor control strategy can include dampening torsional oscillations or vibrations in a driveline of the permanent magnet motor 102. The sensor 120 can be positioned at some location between the gears 104 and the permanent magnet motor 102. Here, the permanent magnet motor 102 includes a rotor shaft 122 on which the sensor 120 is mounted. For example, a shaft 124 can rotatably connect the rotor shaft 122 and the gears 104 to each other. The traction wheel(s)

can be coupled to the gears 104 by one or more drive shafts 126. Collectively, the rotor of the permanent magnet motor 102 (including the rotor shaft 122), the shaft 124, the gears 104 (e.g., a gearbox and/or transmission), and the drive shaft(s) 126 can be referred to as a driveline of the vehicle 100. As mentioned above, torsional oscillations or vibrations can occur in any or all of these areas.

The present subject matter can dampen torsional oscillations or vibrations using a sensor-based rotor speed estimate. The sensor can generate a signal that reflects the rotor rotation in revolutions per minute or a corresponding metric. The sensor can have a sufficiently high sampling frequency that its output can be expected to reflect what is happening in real time, or in near real time. The sampling frequency can be on the order of about multiple tens of thousands of samples per second, or tens of kilohertz (kHz). The resonances sought to be attenuated, by contrast, can be of significantly lower frequency. For example, the resonances can be on the order of about tens of hertz, which is multiple orders of magnitude less than the sampling frequency. That is, if the estimation scheme is sufficiently good, it can be expected to pick up such resonances because they affect motor speed. Particularly, given that the sensor is placed relatively close to the electric motor (e.g., on the rotor shaft), any resonances that happen in the driveline are reflected in the measurement of the sensor. Accordingly, the sensor output can be used in attenuating the torsional oscillations or vibrations of such resonances.

Figure 2:
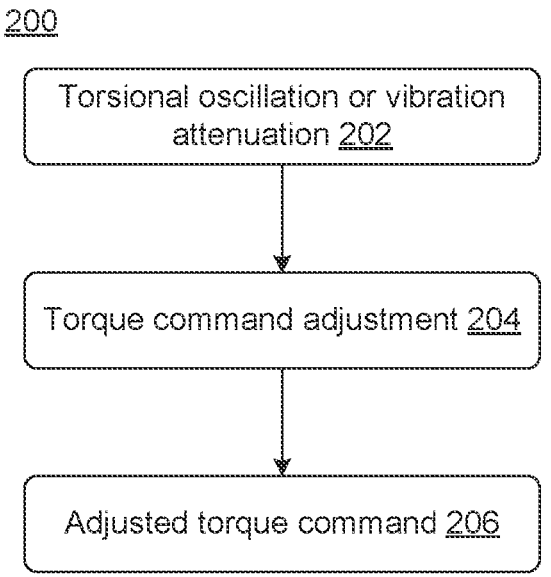
FIG. 2 shows an example of damping torsional oscillations or vibrations that can be performed by the motor controller of the vehicle in FIG. 1.

FIG. 2 shows an example method 200 for damping torsional oscillations or vibrations that can be performed by the motor controller of the vehicle in FIG. 1. The method 200 can, for instance, be implemented by software, hardware, and/or firmware that is included in the MCU 106 of the vehicle 100. Accordingly, for purposes of discussion and illustration, the method 200 will be described with further reference to FIG. 1. Likewise, the examples of FIGS. 3, 4, and/or 5A-5B can also be implemented in the vehicle 100 (e.g., by software, hardware and/or firmware included in the MCU 106) and will also be described with further reference to FIG. 1.

In the method 200, at operation 202, based on present operating conditions of the vehicle 100 (e.g., a present speed of the permanent magnet motor 102, an amount of torque requested from the VCU 118, etc.), the likely occurrence of a torsional oscillation or vibration can be detected and an attenuation signal for dampening the effects of the detected oscillation/vibration can be produced. For instance, the operation 202 can involve using a static or adaptive bandpass filter, and a disturbance-rejection controller.

At operation 204, a torque command, e.g., a driver torque command from the VCU 118, can be adjusted based on the attenuation signal of operation 202. For instance, the attenuation signal can be added to the torque command signal from the VCU 118 to attenuate vibrations/oscillations to a frequency of about zero radians per second. At operation 206, the adjusted torque command can be applied, by the MCU 106, to control the permanent magnet motor 102.

Figure 3:
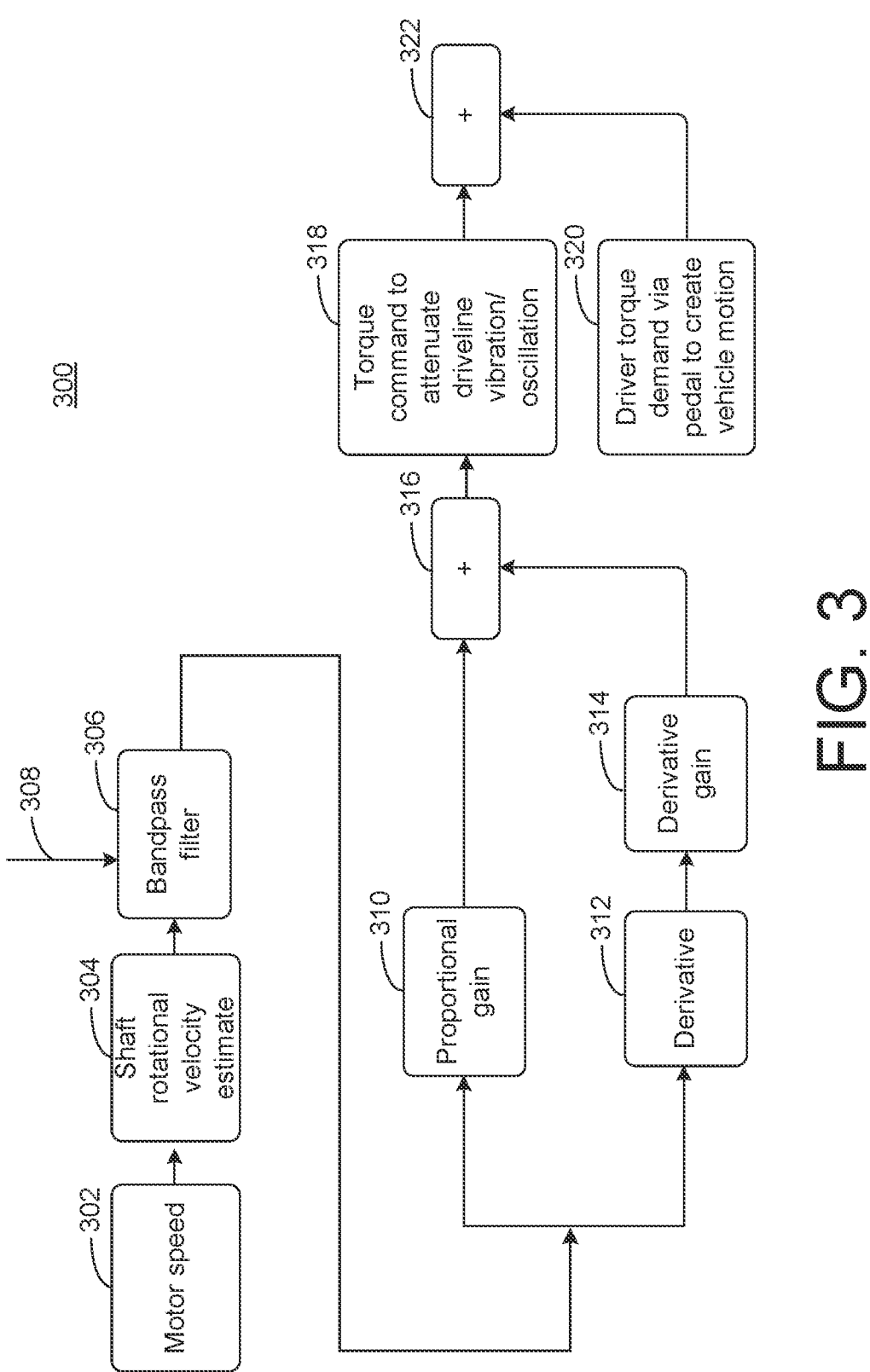
FIG. 3 shows an example of a motor control process that can be performed by the motor controller of the vehicle in FIG. 1 to attenuate torsional oscillations or vibrations in a driveline.

FIG. 3 shows an example 300 of a motor control process that can be performed by the MCU 106 of the vehicle 100 in FIG. 1 to attenuate torsional oscillations or vibrations in a driveline. In the example 300, the upper portion of the diagram (operations 302 to 308) achieves detection of attenuation frequency and passes that attenuation frequency to a disturbance rejection scheme, such as a proportional derivative loop (operations 310 to 322) in the lower portion of FIG. 3. In example implementations, the disturbance rejection loop in FIG. 3 can have a reference of zero (e.g., the seeking to force any frequency output by the bandpass filter to zero).

As shown in FIG. 3, with further reference to FIG. 1, at operation 302 a present speed of the permanent magnet motor is determined or provided (e.g., based on angle measurements from the sensor 120). At operation 304, an estimate of a shaft rotational velocity can be generated. For example, this estimate can take into account a gear ratio used by gears of a powertrain. At operation 306, a bandpass filter can be applied to a signal indicating the present rotational speed. The bandpass filter can filter unwanted elements of the present speed, such as electric noise or signal elements due to driveline dynamics. In some implementations, the bandpass filter is a static bandpass filter that passes through a fixed band of frequencies. In some implementations, the bandpass filter is an adaptive bandpass filter. For example, an adaptive bandpass filter can be used to learn the frequencies of the vibrations/oscillation and the pass through the vibrations using the learnt frequencies. Here, an operation 308 schematically illustrates updating of the adaptive bandpass filter, where the adaptive bandpass filter receives input indicating the frequencies and adapts accordingly.

As shown in FIG. 3, signals passed from the operation 306 are provided to a proportional gain operation 310 and a derivative gain path including operations 312 and 314. In the example 300, the output of the operation 306 is proportional to motor speed (e.g., the gain at operation 310 is applied to the motor speed provided by operation 306). Further in the example 300, at operation 312 a derivative of the provided motor speed signal provided by operation 306 can be determined, providing a motor acceleration (or deceleration) value, and a derivative gain can be applied at operation 314 to produce a value that is proportional to motor acceleration. The values of operations 310 and 314 can then be combined (summed) at operation 316 to generate at an operation 318 a torque command to attenuate driveline vibration or oscillation. At operation 320, a driver torque command signal can be received. In some implementations, this is a torque command from the VCU 118 in the vehicle 100. For example, the vehicle generates this signal based on the driver depressing an accelerator pedal. In an operation 322, the torque command from the operation 318 and the driver torque demand from the operation 320 can be added to provide a combined torque command signal for the vehicle.

The example 300 can be referred to as a feedback controller. In this example, as the motor speed (and associated acceleration/deceleration) changes, the attenuation signal provided by operation 318 will also correspondingly change. In an example, an attenuation signal generated at the operation 318 can be in the form of a sinusoid that is added to the driver torque command. That is, the sinusoidal attenuation signal can be overlaid on the torque command signal. The attenuation signal can, in this example, damp out driveline vibration or oscillation by adjusting inertia of a rotor in a corresponding electric motor. That is, the controller of FIG. 3 can be configured to damp out vibration, with a reference of zero peak-to-peak amplitude. That is, the proportional gain can act as a damper on rotor speed, while the derivative gain can add inertia to the rotor, thus producing a sinusoidal attenuation signal.

Figure 4:
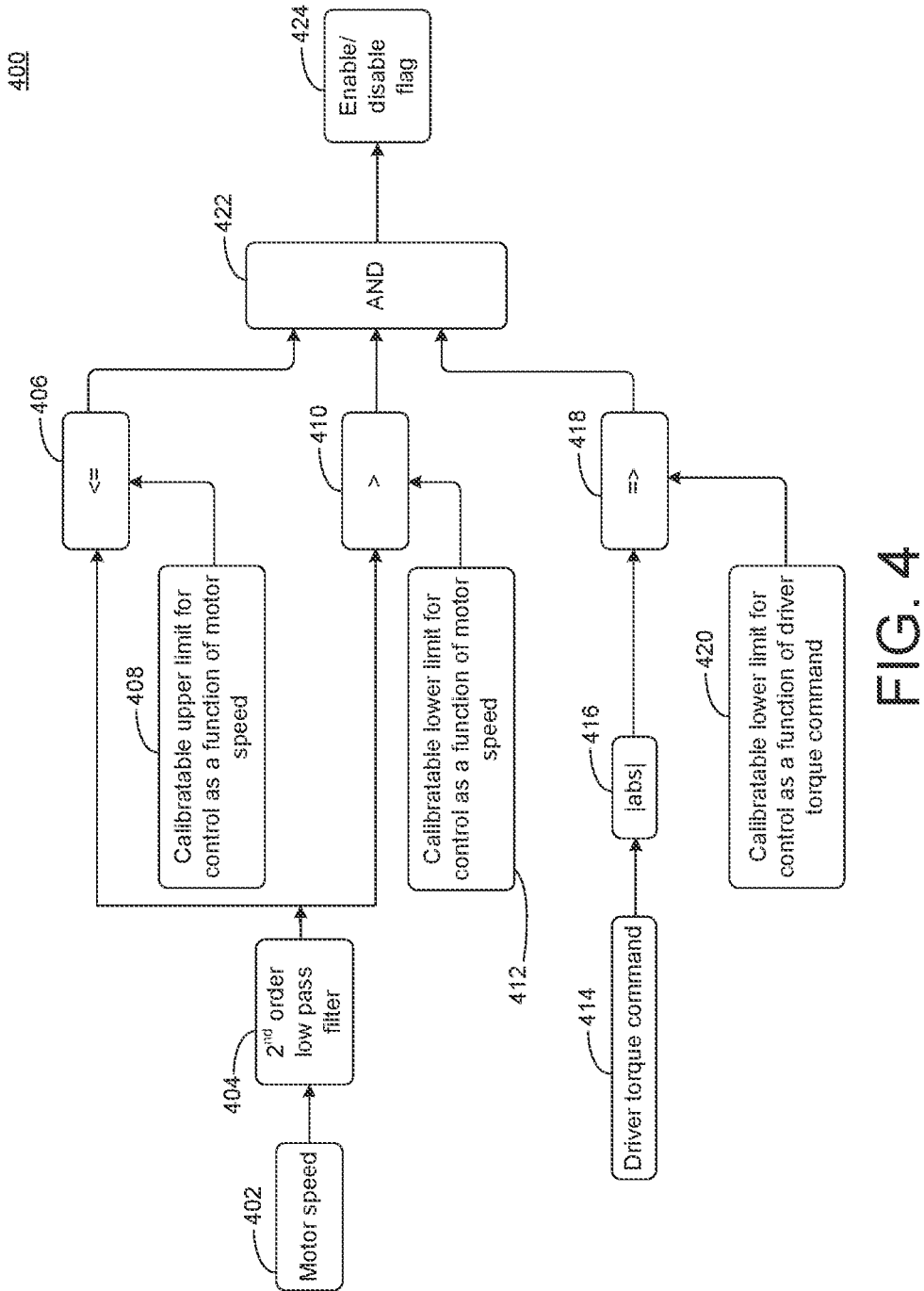
FIG. 4 shows an example of a motor control process that can be performed by the motor controller of the vehicle in FIG. 1 to enable or disable attenuation of torsional oscillations or vibrations.

FIG. 4 shows an example 400 of a motor control process that can be performed by the motor controller of the vehicle in FIG. 1. That is, the process of FIG. 4 can be used to selectively enable or disable attenuation of driveline vibration or oscillation. In some implementations, the process of FIG. 4 can be implemented in conjunction with the process of FIG. 3. In such approaches, the process of FIG. 4 can be used to enable or disable a disturbance-rejection scheme (e.g., the proportional derivative controller of the process of FIG. 3) based on vehicle speed and an amount of torque requested by a driver of the vehicle, e.g., torque requested by the VCU 118 based on depression of an accelerator pedal by a driver. That is, the process of FIG. 4 can be used to enable/disable attenuation of driveline vibration or oscillation based on present vehicle operating conditions (e.g., by enabling/disabling an associated proportional derivative controller based on those operating conditions).

Referring to FIG. 4, in this example, at operation 402 a motor speed is provided, which can be an absolute value of the speed of an electric motor, such as described herein. At operation 404, a second-order low-pass filter can be applied to a signal indicating the present speed. The second-order low pass filter can filter unwanted elements of the present speed, such as electric noise or signal elements due to driveline dynamics.

As shown in FIG. 4, the filtered motor speed from the operation 404 is compared, at operation 406, with an upper motor speed limit 408, which can be calibrated (e.g., based on a corresponding driveline vibration or oscillation for which attenuation is being enabled or disabled). In this example, the operation 406 determines if the filtered motor speed is less than or equal to the upper motor speed limit 408. Similarly, the second-order filtered motor speed from the operation 404 is compared, at operation 410, with a lower motor speed limit 412, which can also be calibrated (e.g., based on the corresponding vibration for which attenuation is being enabled or disabled). The operation 410 determines if the filtered motor speed is greater than the lower motor speed limit 412.

At operation 414 in FIG. 4, a driver torque command (e.g., from a VCU) is provided and, at operation 416, an absolute value of the driver torque command is determined. At operation 418, the absolute value of the driver torque command from the operation 416 is compared with a torque request limit 420 to determine if the absolute value of the driver torque command is greater than or equal to the torque request limit. As indicated in FIG. 4, the torque request limit 420 can also be calibrated (e.g., based on the corresponding driveline vibration or oscillation for which attenuation is being enabled or disabled).

In the example process of FIG. 4, if all three conditions of operations 406, 410 and 418 are met (e.g., motor speed is between the two motor speed limits 408 and 412, and requested torque is greater than or equal to the torque request limit 420), an AND operation 422 will generate a logic high signal (e.g., a logic 1, a true signal, etc.), enabling an associated proportional derivative controller to attenuate torsional oscillations or vibrations. If any of the conditions are not met, the AND operation 422 will generate a logic low signal (e.g., a logic 0, a false signal, etc.), disabling the associated proportional derivative controller. The output of the AND operation 422 can include generation of an enable or disable flag in an operation 424.

In example implementations, use of the process of FIG. 4 to enable and disable proportional derivative controllers for attenuating attenuation of driveline vibration or oscillation of a driveline of an electric motor can reduce switching (e.g., prevent unneeded switching) in an inverter used to generate AC that is provided to the motor to produce torque. This can, in turn, reduce energy (e.g., battery charge) consumption by the motor, which can increase overall efficiency of the motor, preventing reductions in a driving range achievable on a given amount of battery charge (e.g., preventing reduction of vehicle range due to power losses from such unneeded inverter switching).

Figure 5A:
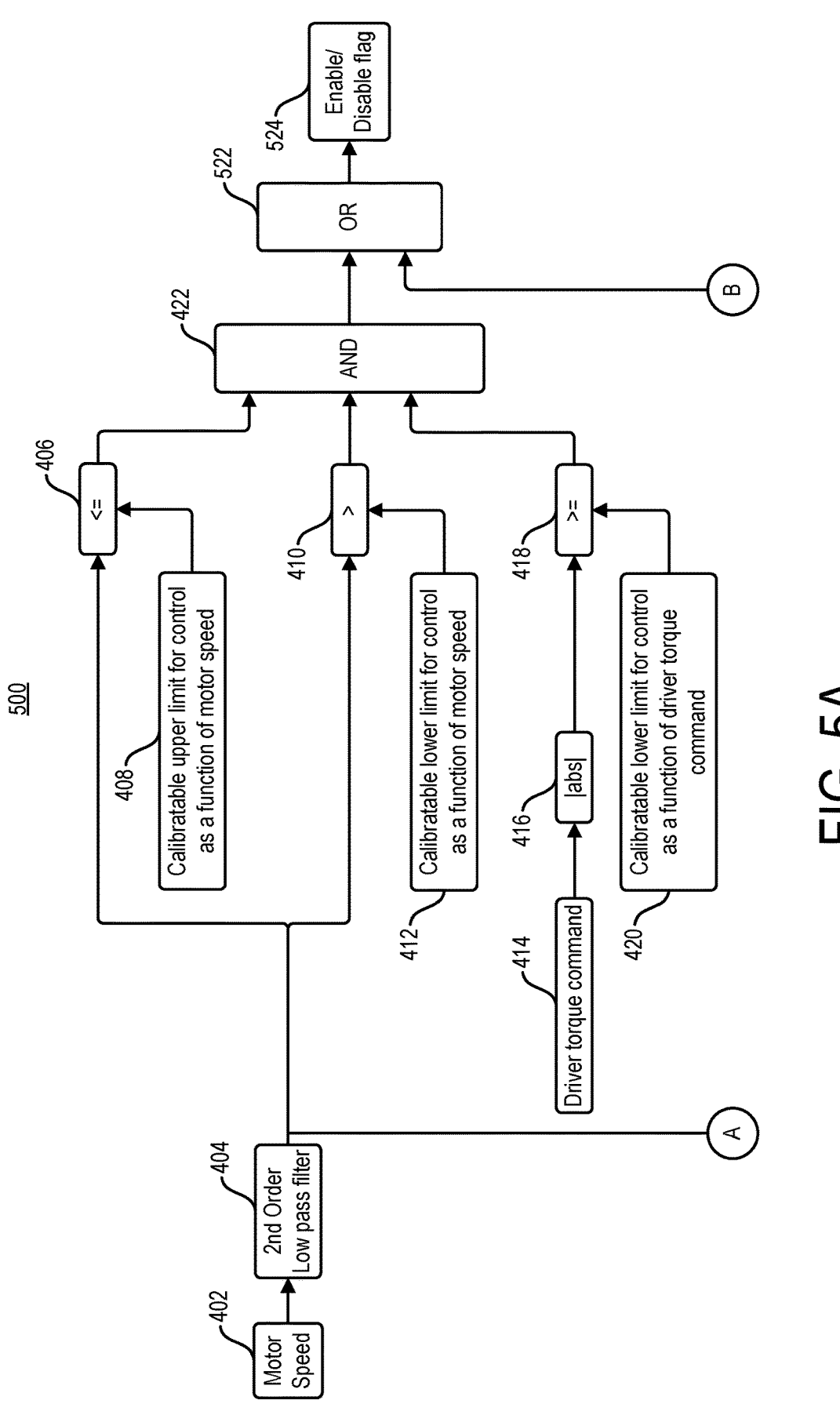
FIGS. 5A-5B show another example of a motor control process that can be performed by the motor controller of the vehicle in FIG. 1 to enable or disable attenuation of torsional oscillations or vibrations.
Figure 5B:
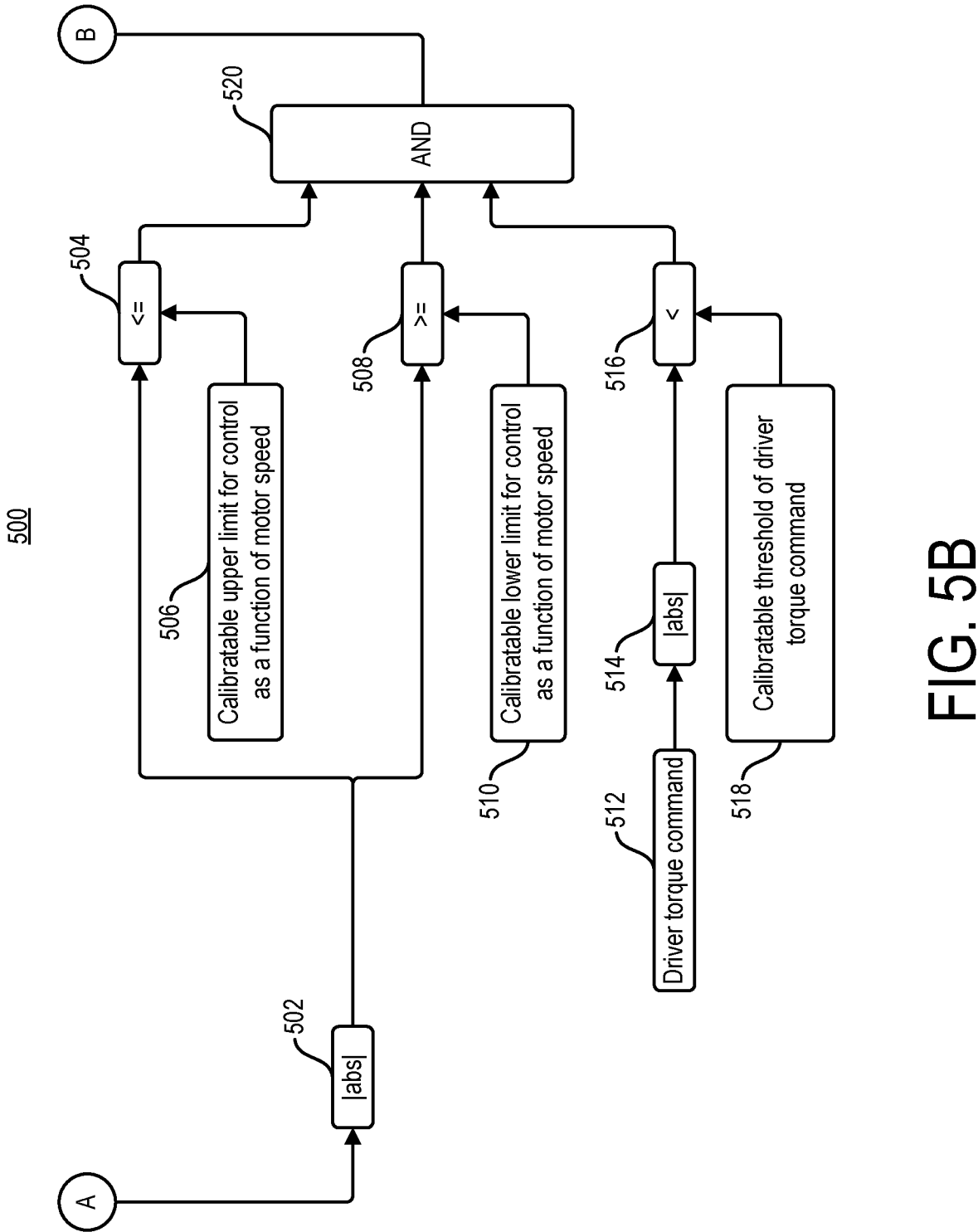

FIGS. 5A-5B show another example 500 of a motor control process that can be performed by the motor controller of the vehicle in FIG. 1 to enable or disable attenuation of torsional oscillations or vibrations. Some aspects of the example 500 are similar or identical to features of the example 400. In the following, some differences are described.

In the example 500, the output of the second-order low-pass filter in operation 404 can be provided to one or more enablement determinations. In some implementations, a first enablement determination is shown in FIG. 5A and can include at least the operations 406 through 422. That is, the first enablement determination can generate a logic high if all three conditions of operations 406, 410 and 418 are met (e.g., motor speed is between the two motor speed limits 408 and 412, and requested torque is greater than or equal to the torque request limit 420). The first enablement determination can result in a logic high or low at the AND operation 422.

In some implementations, the output of the second-order low-pass filter in operation 404 can also or instead be provided to a second enablement determination shown in FIG. 5B. Namely, at point A in FIG. 5A the output of the second-order low-pass filter in operation 404 is provided to an operation 502 in which an absolute value of the filtered motor speed is determined. The absolute value from the operation 502 is compared, at operation 504, with an upper motor speed limit 506, which can be calibrated (e.g., based on a corresponding driveline vibration or oscillation for which attenuation is being enabled or disabled). In this example, the operation 504 determines if the filtered motor speed is less than or equal to the upper motor speed limit 506. Similarly, the absolute value from the operation 502 is compared, at operation 508, with a lower motor speed limit 510, which can also be calibrated (e.g., based on the corresponding torsional oscillations or vibrations for which attenuation is being enabled or disabled). The operation 508 determines if absolute value of the filtered motor speed is greater than or equal to the lower motor speed limit 510.

At operation 512 in FIG. 5B, a driver torque command (e.g., from a VCU) is provided and, at operation 514, an absolute value of the driver torque command is determined. At operation 516, the absolute value of the driver torque command from the operation 514 is compared with a threshold 518 of driver torque demand to determine if the absolute value of the driver torque command is smaller than the threshold 518. As indicated in FIG. 5B, the threshold 518 can also be calibrated (e.g., based on the corresponding driveline vibration or oscillation for which attenuation is being enabled or disabled).

In the example process of FIG. 5B, if all three conditions of operations 504, 508 and 516 are met (e.g., motor speed is between the two motor speed limits 506 and 510, and requested torque is less than the threshold 518), an AND operation 520 will generate a logic high signal (e.g., a logic 1, a true signal, etc.). That is, the second enablement determination, which can include at least the operations 502 through 520, can result in a logic high or low at the AND operation 520.

At point B in FIG. 5B, the output of the AND operation 520 is provided to an OR operation 522 in FIG. 5A. That is, the OR operation 522 takes as inputs the respective outcomes of the first and second enablement determinations. The OR operation 522 generates a logic high if either or both of the first and second enablement determinations results in a logic high. On the contrary, the OR operation 522 generates a logic low if both of the first and second enablement determinations results in a logic low. The output of the OR operation 522 can include generation of an enable or disable flag in an operation 524.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   applying, by a motor controller of an electric motor, a bandpass filter to a signal from a sensor on a rotor of the electric motor, the signal indicating rotational speed of the rotor to detect a torsional oscillation or vibration in a driveline of the electric motor to be attenuated;
   providing the filtered signal to a proportional derivative controller configured for disturbance rejection;
   generating, by the proportional derivative controller, an attenuation signal for attenuating the torsional oscillation or vibration in the driveline;
   combining the attenuation signal with a driver torque command signal to produce a combined torque command signal, the driver torque command signal indicating an amount of torque requested from the electric motor; and producing torque with the electric motor based on the combined torque command signal.

2. The method of claim 1, wherein the signal indicating the rotational speed of the rotor includes an estimate that takes into account a gear ratio used by gears of a powertrain.

3. The method of claim 1, wherein the bandpass filter is a static bandpass filter that passes through a fixed band of frequencies.

4. The method of claim 1, wherein the bandpass filter is an adaptive bandpass filter, the method further comprising detecting a frequency at which the torsional oscillation or vibration occurs in the driveline, and updating the adaptive bandpass filter based on the detected frequency.

5. The method of claim 1, further comprising:
   enabling the proportional derivative controller in response to at least a first enablement determination comprising:
      the rotational speed being greater than a lower speed limit and less than or equal to an upper speed limit; and
      an amount of torque requested by the torque command signal being greater than or equal to a first threshold.

6. The method of claim 5, further comprising:
   enabling the proportional derivative controller in response to the first enablement determination or a second enablement determination based on an absolute value of the rotational speed;
   otherwise, disabling the proportional derivative controller.

7. The method of claim 6, wherein the second enablement determination takes into account the absolute value of the rotational speed and the driver torque command signal.

8. The method of claim 7, wherein the second enablement determination comprises:
   the absolute value of the rotational speed being greater than or equal to a lower speed limit and less than or equal to an upper speed limit; and
   an amount of torque requested by the driver torque command signal being less than a second threshold.

9. The method of claim 1, wherein the driveline comprises the electric motor, gears, or a drive shaft of an electric vehicle.

10. A vehicle comprising:
   an electric motor having a rotor;
   a sensor on the rotor, the sensor configured to generate a signal indicating a rotational speed of the rotor; and
   a motor controller, including:
      a bandpass filter configured to filter to the signal to produce a filtered signal to detect a torsional oscillation or vibration in a driveline of the electric motor to be attenuated; and
      a proportional derivative controller configured for disturbance rejection, the proportional derivative controller generating, based on the filtered signal, an attenuation signal for attenuating the torsional oscillation or vibration in the driveline,
   wherein:
      the motor controller is configured to combine the attenuation signal with a driver torque command signal to produce a combined torque command signal, the driver torque command signal indicating an amount of torque requested from the electric motor, and
      the electric motor is configured to produce torque based on the combined torque command signal.

11. The vehicle of claim 10, wherein the signal indicating the rotational speed of the rotor includes an estimate that takes into account a gear ratio used by gears of a powertrain.

12. The vehicle of claim 10, wherein the bandpass filter is a static bandpass filter that passes through a fixed band of frequencies.

13. The vehicle of claim 10, wherein the bandpass filter is an adaptive bandpass filter, and wherein the motor controller detects a frequency at which the torsional oscillation or vibration occurs in the driveline, and updates the adaptive bandpass filter based on the detected frequency.

14. The vehicle of claim 10, wherein the motor controller enables the proportional derivative controller in response to at least a first enablement determination comprising:

the rotational speed being greater than a lower speed limit and less than or equal to an upper speed limit; and an amount of torque requested by the torque command signal being greater than or equal to a first threshold.

15. The vehicle of claim 14, wherein the motor controller:

enables the proportional derivative controller in response to the first enablement determination or a second enablement determination based on an absolute value of the rotational speed;

otherwise, disables the proportional derivative controller.

16. The vehicle of claim 15, wherein in the second enablement determination the motor controller takes into account the absolute value of the rotational speed and the driver torque command signal.

17. The vehicle of claim 16, wherein the second enablement determination comprises:

the absolute value of the rotational speed being greater than or equal to a lower speed limit and less than or equal to an upper speed limit; and an amount of torque requested by the driver torque command signal being less than a second threshold.

18. The vehicle of claim 10, wherein the sensor includes at least one of a resolver or an encoder.

19. The vehicle of claim 10, wherein the driveline comprises the electric motor, gears, or a drive shaft of the vehicle.

* * * * *